(12) United States Patent  
Matsuura

(10) Patent No.: US 12,197,934 B2  
(45) Date of Patent: Jan. 14, 2025

(54) INFORMATION PROCESSING DEVICE, CONTROL METHOD, NON-TRANSITORY STORAGE MEDIUM, AND VEHICLE

(71) Applicant: TOYOTA JIDOSHA KABUSHIKI KAISHA, Toyota (JP)

(72) Inventor: Takashi Matsuura, Shinagawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 495 days.

(21) Appl. No.: 17/474,549

(22) Filed: Sep. 14, 2021

(65) Prior Publication Data

US 2022/0197686 A1 Jun. 23, 2022

(30) Foreign Application Priority Data

Dec. 22, 2020 (JP) .................................. 2020-212732

(51) Int. Cl.
G06F 9/45 (2006.01)
G06F 9/455 (2018.01)

(52) U.S. Cl.
CPC ................. *G06F 9/45558* (2013.01)

(58) Field of Classification Search
None
See application file for complete search history.

(56) References Cited

U.S. PATENT DOCUMENTS 9,389,894 B1* 7/2016 Zhang ................. G06F 9/45558
2020/0050164 A1 2/2020 Sakata et al.
2020/0326989 A1* 10/2020 Li ....................... H04L 67/1031

FOREIGN PATENT DOCUMENTS

| EP | 0701928 A1 * | 9/1994 | |
| JP | 2010-134518 A | 6/2010 | |
| WO | WO-2014175883 A1 * | 10/2014 | ......... G06F 9/45533 |
| WO | WO 2018/198184 A1 | 11/2018 | |

OTHER PUBLICATIONS

Office Action issued Apr. 9, 2024, in corresponding Japanese Patent Application No. 2020-212732, citing document 15 and 24 therein, 3 pages.
Miyabi Kimura Hide, "A Foreign System Connecting a Different System Softly", Nikkei Automotive, Japan, Nikkei BP, Jun. 11, 2019, vol. 100, p. 54 to p. 56.

* cited by examiner

*Primary Examiner* — Craig C Dorais
(74) *Attorney, Agent, or Firm* — Oblon, McClelland, Maier & Neustadt, L.L.P.

(57) ABSTRACT

An information processing device equipped with a hypervisor configured to implement a plurality of virtual machines, the information processing device includes a CPU including a plurality of CPU cores, wherein the CPU is configured to, when a virtual machine to be executed included in the virtual machines is a first virtual machine having a required level for functional safety that is equal to or higher than a predetermined reference level, cause at least two of the CPU cores to respectively execute same processing of the first virtual machine.

5 Claims, 7 Drawing Sheets

ORDER OF PRIORITY: VM1 > VM2 > VM3 > VM4 > VM5

INFORMATION PROCESSING DEVICE, CONTROL METHOD, NON-TRANSITORY STORAGE MEDIUM, AND VEHICLE

CROSS-REFERENCE TO RELATED APPLICATION

This application claims priority to Japanese Patent Application No. 2020-212732 filed on Dec. 22, 2020, incorporated herein by reference in its entirety.

BACKGROUND

1. Technical Field

The present disclosure relates to an information processing device, a control method, a non-transitory storage medium, and a vehicle.

2. Description of Related Art

International Publication No. WO 2018/198184 discloses a control device using a lock step dual core (LSDC) technique. In the control device described in International Publication No. 2018/198184 (WO 2018/198184), when a second central processing unit (CPU) fails while different applications are running on a first CPU that has an LSDC function and the second CPU that does not have the LSDC function, a lock step mode of the first CPU is cancelled, and the application running on the second CPU is caused to fall back to one of CPU cores of the first CPU. The control device described in WO 2018/198184 thus reduces the influence that occurs when the second CPU fails.

SUMMARY

However, the control that is performed by the control device described in WO 2018/198184 is an emergency response in the event of a failure, and does not consider suppressing a decrease in processing capability. It is therefore difficult to apply this control as it is to an electronic control unit (ECU) in which a plurality of applications with different required functional safety levels are installed and for which high processing capability is required.

The present disclosure provides an information processing device etc. that can implement high processing capability for a plurality of applications with different required functional safety levels.

An information processing device according to a first aspect of the present disclosure is equipped with a hypervisor configured to implement a plurality of virtual machines. The information processing device includes a CPU including a plurality of CPU cores, wherein the CPU is configured to, when a virtual machine to be executed included in the virtual machines is a first virtual machine having a required level for functional safety that is equal to or higher than a predetermined reference level, cause at least two of the CPU cores to respectively execute same processing of the first virtual machine.

A control method according to a second aspect of the present disclosure is performed by a CPU of an information processing device equipped with a hypervisor configured to implement a plurality of virtual machines. The CPU includes a plurality of CPU cores, and the control method includes, when a virtual machine to be executed included in the virtual machines is a first virtual machine having a required level for functional safety that is equal to or higher than a predetermined reference level, causing at least two of the CPU cores to respectively execute same processing of the first virtual machine.

A non-transitory storage medium according to a third aspect of the present disclosure stores a control program that is executable by a CPU of an information processing device equipped with a hypervisor configured to implement a plurality of virtual machines and that causes the CPU to perform functions. The CPU including a plurality of CPU cores, and the functions include, when a virtual machine to be executed included in the virtual machines is a first virtual machine having a required level for functional safety that is equal to or higher than a predetermined reference level, causing at least two of the CPU cores to respectively execute same processing of the first virtual machine.

A vehicle according to a fourth aspect of the preset disclosure may include the information processing device according to the first aspect.

The information processing device, the control method, the non-transitory storage medium, and the vehicle of the present disclosure has high processing capability for a plurality of applications with different required functional safety levels.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An information processing device of the present disclosure determines a method and order of allocating a plurality of virtual machines to a plurality of CPU cores based on priority levels given in advance to the virtual machines in a structure in which a plurality of electronic control units (ECUs) is consolidated and integrated into one high-performance processor by using a virtualization technique such as a hypervisor. Processing of the information processing device thus becomes more efficient. An embodiment of the present disclosure will be described in detail with reference to the drawings.

Configuration

Figure 1:
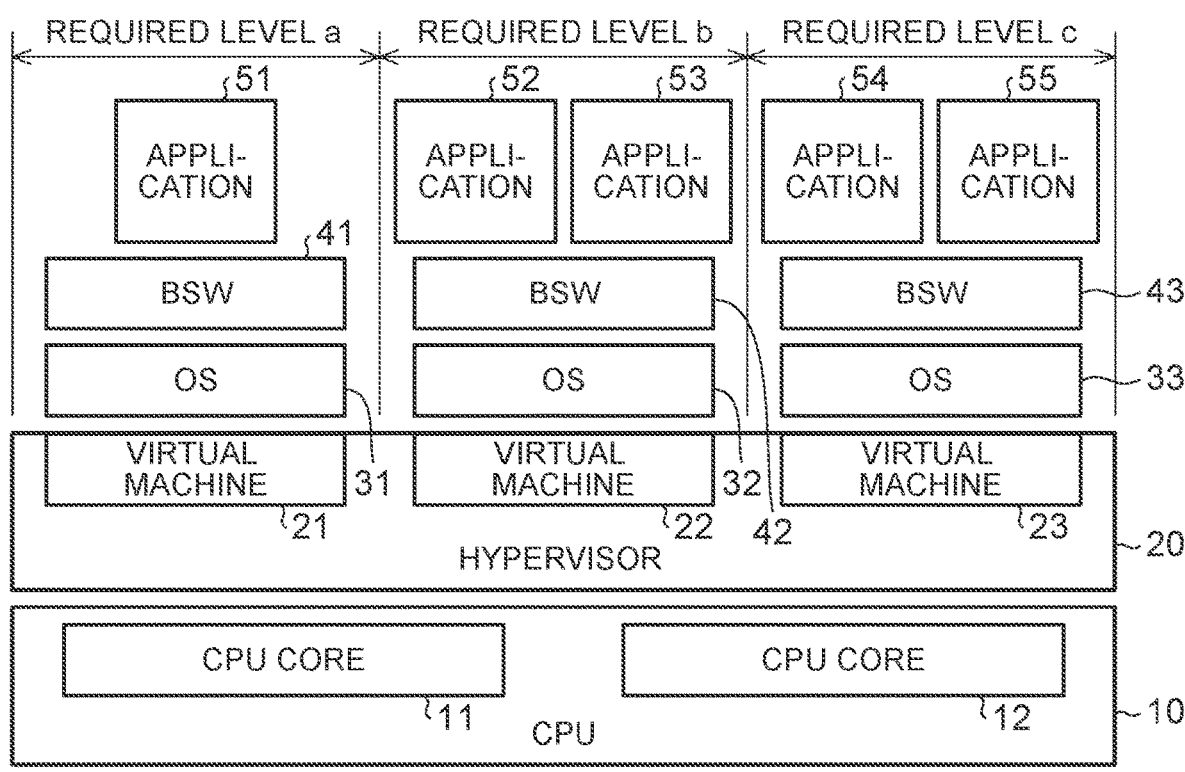
FIG. 1 is a block diagram illustrating a schematic configuration of an information processing device according to an embodiment of the present disclosure.

FIG. 1 is a block diagram illustrating a schematic configuration of an information processing device 1 according to an embodiment of the present disclosure. The information processing device 1 illustrated in FIG. 1 includes in its configuration a CPU 10, a hypervisor 20, operating systems (OSs) 31 to 33, basic software (BSW) 41 to 43, applications 51 to 55, and a storage unit (not shown).

The CPU 10 is a processor with high processing capability that is contained on a System on a Chip (SoC) etc. The CPU 10 has a plurality of CPU cores 11 and 12 as processing units and has what is called a lock step dual core (LSDC) function that can switch the CPU 10 between a lock step mode and a non-lock step mode by a register etc. The lock step mode is a mode in which the CPU cores 11 and 12 perform the same calculation with the same input and the calculation results of the CPU cores 11 and 12 are considered correct only when these calculation results are identical. The non-lock step mode is a mode in which the CPU cores 11 and 12 perform different calculations with different inputs.

The hypervisor 20 is software that runs on the CPU 10, and is a virtualization mechanism that implements a plurality of virtual machines (VMs) 21 to 23. The hypervisor 20 can configure, separate, and manage the virtual machines 21 to 23 and can add predetermined parameters for the virtual machines 21 to 23. The hypervisor 20 of the present embodiment can appropriately allocate the virtual machines 21 to 23 to the CPU cores 11 and 12 based on priority levels, which will be described later, stored in the storage unit of the information processing device 1, and can perform control to cause the CPU cores 11 and 12 to execute the processing of the allocated virtual machines 21 to 23 (control unit).

The virtual machines 21 to 23 are virtualized computers that are managed by and run on the hypervisor 20. Each virtual machine 21 to 23 is composed of a virtual CPU, a virtual memory, a virtual network, a virtual storage, etc. and can behave like a single piece of computer hardware by simulating the operation of a computer. The OS 31 and the BSW 41 for running the installed application 51 on the virtual machine 21 are implemented on the virtual machine 21. The OS 32 and the BSW 42 for running the installed applications 52 and 53 on the virtual machine 22 are implemented on the virtual machine 22. The OS 33 and the BSW 43 for running the installed applications 54 and 55 on the virtual machine 23 are implemented on the virtual machine 23. All of the OSs 31 to 33 may be the same, or a part or all of the OSs 31 to 33 may be different. All of the BSWs 41 to 43 may be the same, or a part or all of the BSWs 41 to 43 may be different.

A priority level including information on order of priority and required level is given in advance to each of the virtual machines 21 to 23. The order of priority is information indicating the order in which the virtual machines 21 to 23 should be allocated to the CPU core 11 and/or the CPU core 12 and executed. The required level is information indicating requirements for functional safety of the applications 51 to 55 that are installed in the virtual machines 21 to 23. In the example of FIG. 1, the highest priority is given to the virtual machine 21, and the lowest priority is given to the virtual machine 23. Required level a is given to the virtual machine 21, required level b is given to the virtual machine 22, and required level c is given to the virtual machine 23.

For example, parameters based on the Automotive Safety Integrity Level (ASIL) can be used for the required levels. The ASIL is a risk classification system defined by the ISO 26262 standard for functional safety of road vehicles.

There are five ASIL levels defined based on exposure, controllability, and severity in the event of a failure of a vehicle: ASIL-D, ASIL-C, ASIL-B, ASIL-A, and QM. ASIL-D is a parameter indicating that the level required for a failure detection mechanism etc. is the highest, and QM is a parameter indicating that the level required for a failure detection mechanism etc. is the lowest. For example, ASIL-D for which the strictest requirements are required to ensure safety is mainly given to functions that directly relate to traveling of a vehicle, namely "run, turn, and stop," and safety, such as airbags, anti-lock braking system (ABS), and electric power steering (EPS). ASIL-B is mainly given to functions that indirectly relate to safety, such as headlights and brake lights. QM is given to functions that do not affect safety even if a failure occurs, such as car audio.

Although the configuration including the three virtual machines 21 to 23 is illustrated in the example of FIG. 1, the configuration is not limited to this. The number and types of applications 51 to 55 that are implemented in each virtual machine 21 to 23 are also not limited to those illustrated in the figure.

When a plurality of requests for executing processing is generated from the virtual machines 21 to 23, the information processing device 1 of the present disclosure suitably controls allocation of the vertical machines 21 to 23 to the CPU cores 11 and 12 for executing the requests as follows.

Control

Figure 2A:
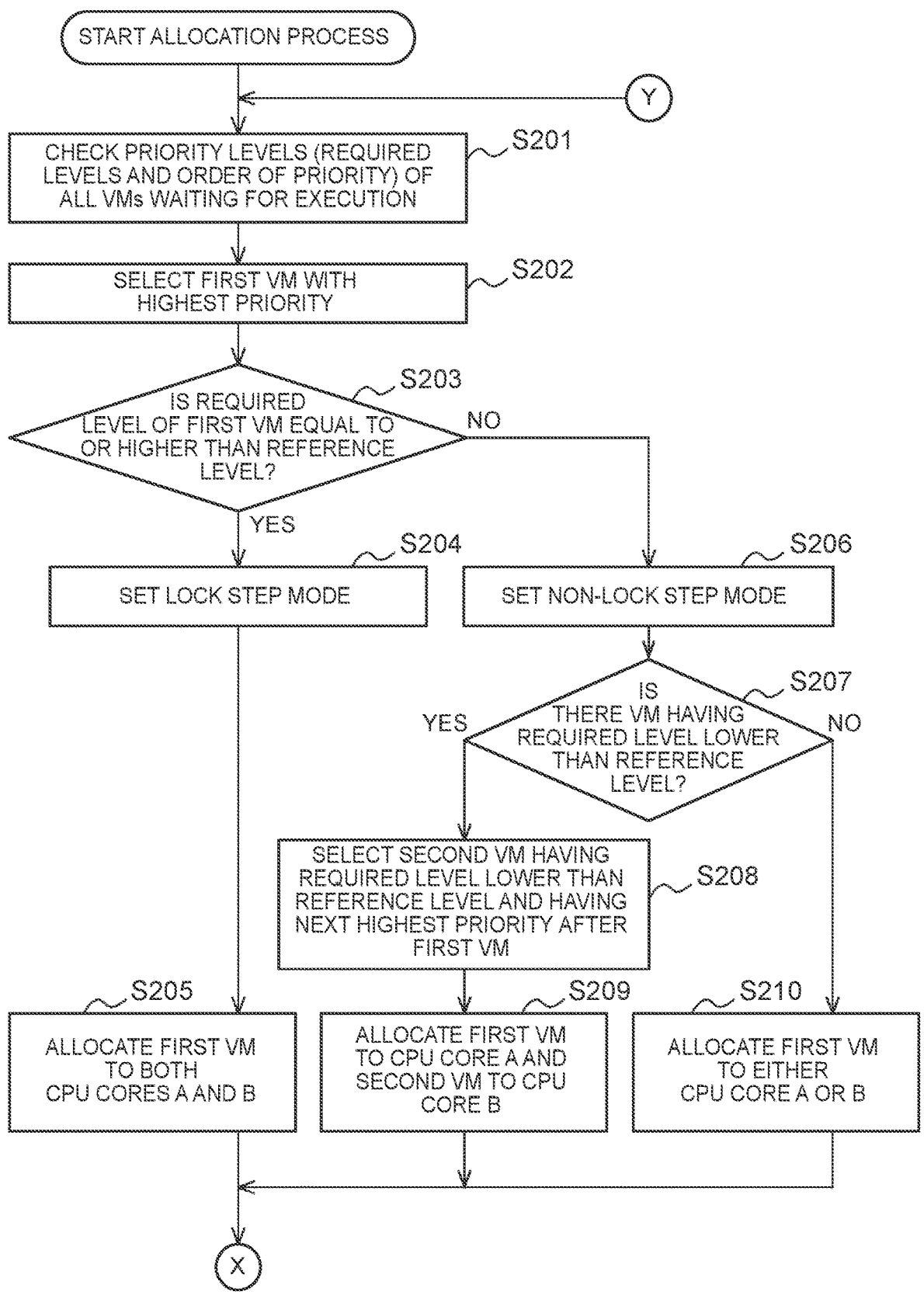
FIG. 2A is a flowchart of a virtual machine allocation process that is executed by a hypervisor of the information processing device.
Figure 2B:
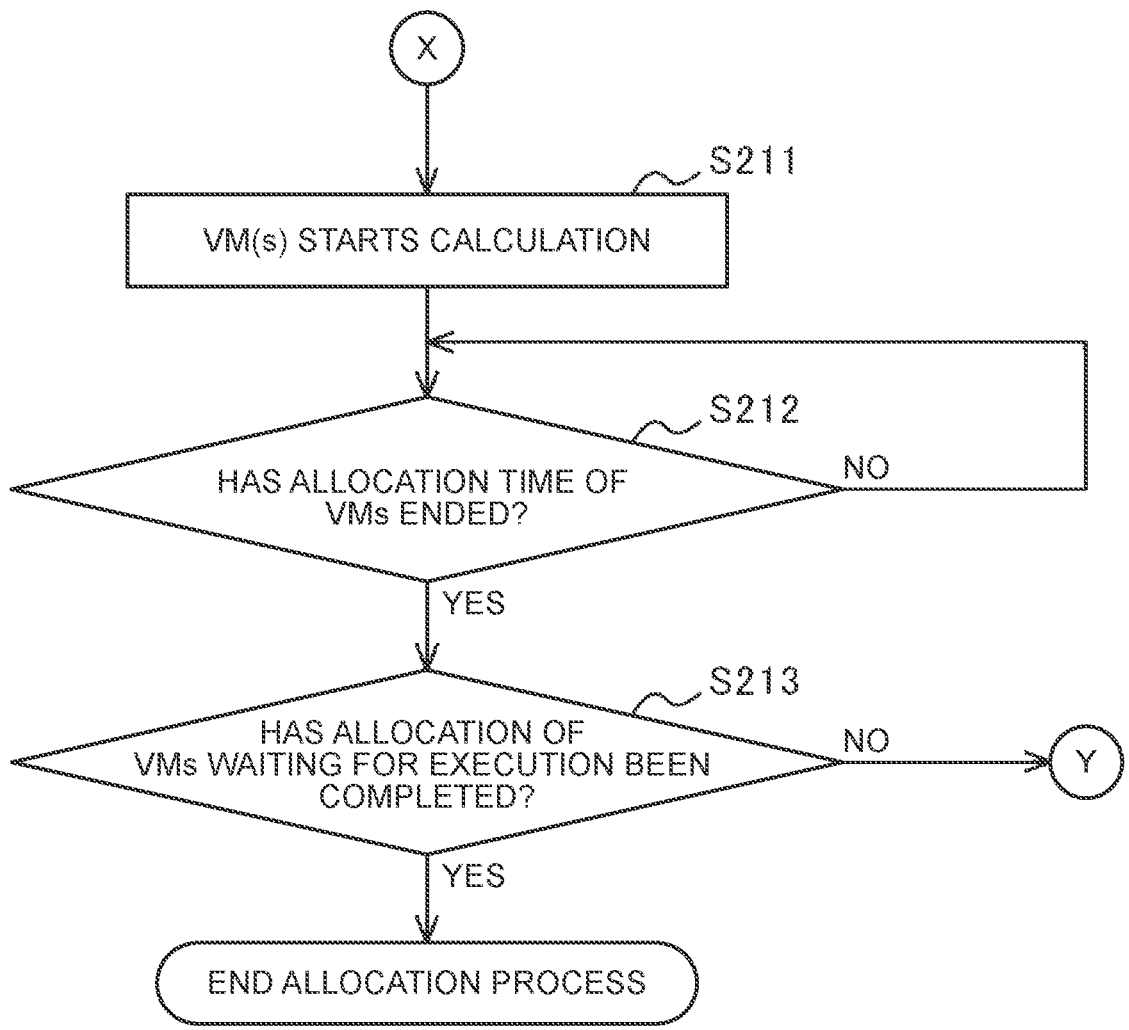
FIG. 2B is a flowchart of the virtual machine allocation process that is executed by the hypervisor of the information processing device.

The control that is performed by the information processing device 1 of the present disclosure will be described with further reference to FIGS. 2A, 2B, 3, and 4. FIGS. 2A and 2B are flowcharts of a virtual machine allocation process that is executed by the hypervisor 20 of the information processing device 1. The process of FIG. 2A and the process of FIG. 2B are connected by connectors X and Y. The allocation process of the present embodiment is repeatedly executed every "allocation time." The allocation time is a unit of time in which the CPU cores can be occupied and the virtual machines can be allocated to the CPU cores.

An example in which the information processing device 1 has a configuration illustrated in FIG. 3 (Specific Example 1) will be given in the description of the allocation process of the present embodiment. In Specific Example 1 illustrated in FIG. 3, the processing units that are mounted on the CPU 10 are a CPU core A and a CPU core B, and virtual machines VM1 to VM5 in which an OS, BSW, and an application (APP) are implemented are running on the hypervisor 20. Required levels for functional safety ASIL-D, ASIL-B, ASIL-B, ASIL-B, and QM and the order of priority VM1>VM2>VM3>VM4>VM5 are given to the virtual machines VM1, VM2, VM3, VM4, and VM5, respectively, as priority levels.

The virtual machine allocation process illustrated in FIGS. 2A and 2B is started when the time to allocate each virtual machine VM1 to VM5 to the CPU core A and the CPU core B (first allocation time) comes after the information processing device 1 and each application are started by turning on the power and processing at startup is finished.

Step S201

The hypervisor 20 checks the priority levels (required levels and order of priority) of all virtual machines (VMs) waiting for execution of processing. In the first process cycle of Specific Example 1, the priority levels of all the virtual machines VM1 to VM5 are checked, and it is confirmed that the required levels of the virtual machines VM1 to VM5 are ASIL-D for the virtual machine VM1, ASIL-B for the virtual machine VM2, ASIL-B for the virtual machine VM3, ASIL-B for the virtual machine VM4, and QM for the virtual machine VM5 and that the order of priority is virtual machine VM1>virtual machine VM2>virtual machine VM3>virtual machine VM4>virtual machine VM5. The virtual machines that have been allocated in steps S205, S209, and S210 that will be described later are sequentially removed from the virtual machines of which priority levels are to be checked. After the priority levels of all the virtual machines waiting for execution are checked, the routine proceeds to step S202.

Step S202

The hypervisor 20 selects as a virtual machine to be allocated a first virtual machine (first VM) that is a virtual machine with the highest priority from the virtual machines (VMs) of which priority levels have been checked in step S201. In the first process cycle of Specific Example 1, the virtual machine VM1 is selected as the first virtual machine. After the first virtual machine is selected as a virtual machine to be allocated, the routine proceeds to step S203.

Step S203

The hypervisor 20 determines whether the required level of the first virtual machine (first VM) is equal to or higher than a predetermined reference level. The predetermined reference level is a reference for determining whether to run the virtual machine on a plurality of CPU cores or a single CPU core, and is set based on the functional safety required for an application that is installed in the virtual machine, etc. In the present embodiment, as an example, ASIL-D is set as the reference level, and it is determined whether the required level of the first virtual machine is equal to or higher than ASIL-D. In the first process cycle of Specific Example 1, since the virtual machine VM1 with the required level ASIL-D is the first virtual machine, it is determined that the required level of the first virtual machine is equal to or higher than the reference level. When it is determined that the required level of the first virtual machine is equal to or higher than the reference level (YES in step S203), the routine proceeds to step S204. When it is determined that the required level of the first virtual machine is lower than the reference level (NO in step S203), the routine proceeds to step S206.

Step S204

The hypervisor 20 sets the CPU 10 to the lock step mode. That is, when the current setting is the lock step mode, this setting is maintained. When the current setting is the non-lock step mode, the CPU 10 is switched to the lock step mode. This allows the CPU core A and the CPU core B to perform the same calculation with the same input. After the lock step mode is set, the routine proceeds to step S205.

Step S205

The hypervisor 20 allocates the first virtual machine (first VM) to both the CPU core A and the CPU core B that are in the lock step mode. In the first process cycle of Specific Example 1, the virtual machine VM1 is allocated to both the CPU core A and the CPU core B. When the allocation of the first virtual machine is completed, the routine proceeds to step S211.

Step S206

The hypervisor 20 sets the CPU 10 to the non-lock step mode. That is, when the current setting is the non-lock step mode, this setting is maintained. When the current setting is the lock step mode, the CPU 10 is switched to the non-lock step mode. This allows the CPU core A and the CPU core B to perform different calculations with different inputs. After the non-lock step mode is set, the routine proceeds to step S207.

Step S207

The hypervisor 20 determines whether there is a virtual machine (VM) having a required level that is lower than the reference level among all the virtual machines waiting for execution except the first virtual machine (first VM). In the first process cycle of Specific Example 1, since the virtual machines VM2 to VM5 other than the virtual machine VM1 have a required level ASIL-B or QM, it is determined that there is a virtual machine having a required level that is lower than the reference level. When it is determined that there is a virtual machine having a required level that is lower than the reference level (YES in step S207), the routine proceeds to step S208. When it is determined that there is no virtual machine having a required level that is lower than the reference level (NO in step S207), the routine proceeds to step S210.

Step S208

The hypervisor 20 selects as a virtual machine to be allocated a second virtual machine (second VM) that is a virtual machine having a required level lower than the reference level and having the next highest priority after the first virtual machine (first VM). In the first process cycle of Specific Example 1, the virtual machine VM2 having a required level ASIL-B and having the second highest priority is selected as the second virtual machine. After the second virtual machine is selected as a virtual machine to be allocated, the routine proceeds to step S209.

Step S209

The hypervisor 20 allocates the first virtual machine (first VM) and the second virtual machine (second VM) to the CPU core A and the CPU core B that are in the non-lock step mode, respectively. In the first process cycle of Specific Example 1, the virtual machine VM1 is allocated to the CPU core A, and the virtual machine VM2 is allocated to the CPU core B. The virtual machines VM1 and VM2 may be allocated to the CPU core B and the CPU core A, respectively. When the allocation of the first virtual machine and the second virtual machine is completed, the routine proceeds to step S211.

Step S210

The hypervisor 20 allocates the first virtual machine (first VM) to the CPU core A (or the CPU core B) that is in the non-lock step mode. When the allocation of the first virtual machine is completed, the routine proceeds to step S211.

Step S211

The hypervisor 20 causes the virtual machine(s) (VM(s)) allocated to the CPU core A and the CPU core B to start calculation. When the calculation of the virtual machine(s) is started, the routine proceeds to step S212.

Step S212

The hypervisor 20 determines whether the allocation time of the virtual machines (VMs) to the CPU core A and the CPU core B has ended. When the allocation time of the virtual machines has ended (YES in step S212), the routine proceeds to step S213. Otherwise, the routine waits until the allocation time of the virtual machines ends.

Step S213

The hypervisor 20 determines whether allocation of all the virtual machines (VMs) waiting for execution of processing has been completed. When allocation of the virtual machines has been completed (YES in step S213), the allocation process is ended. When allocation of the virtual machines has not been completed (NO in step S213), the routine proceeds to step S201.

Figure 3:
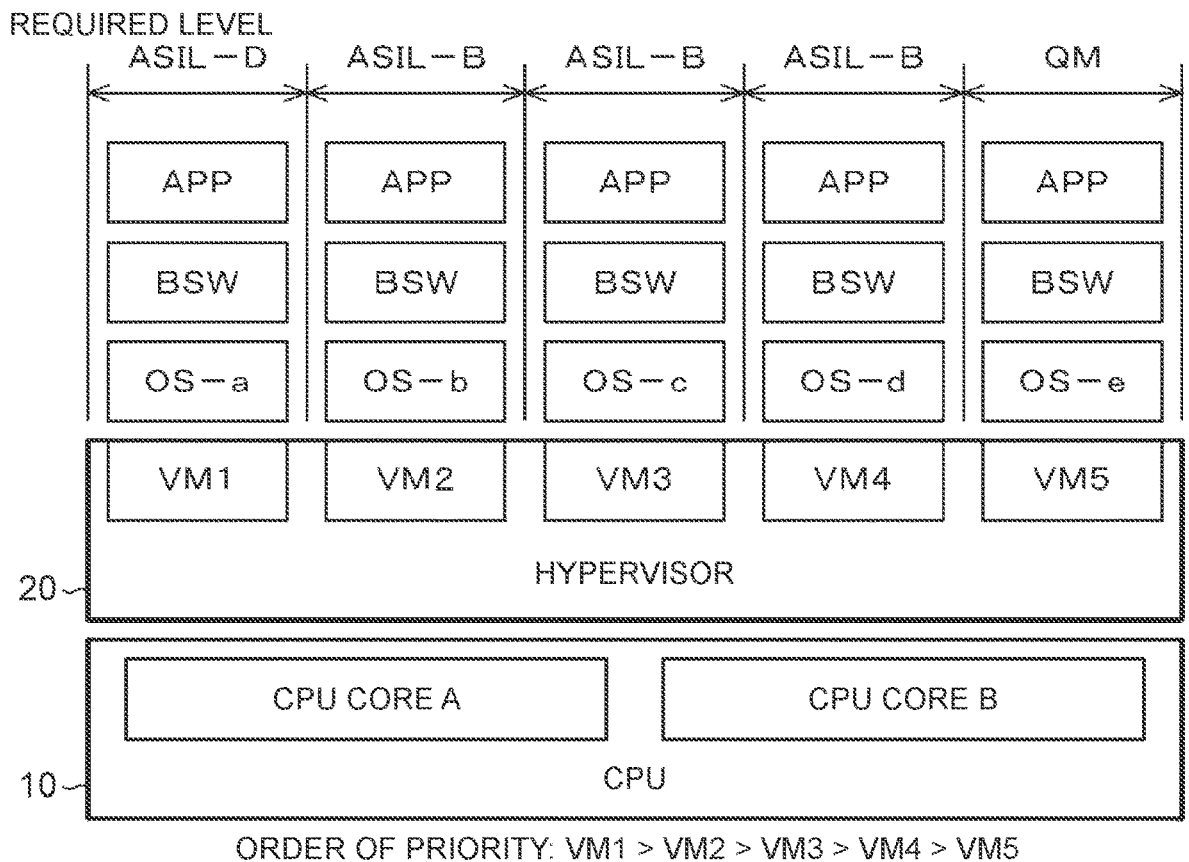
FIG. 3 illustrates an example of a configuration included in the information processing device (Specific Example 1)
Figure 4:
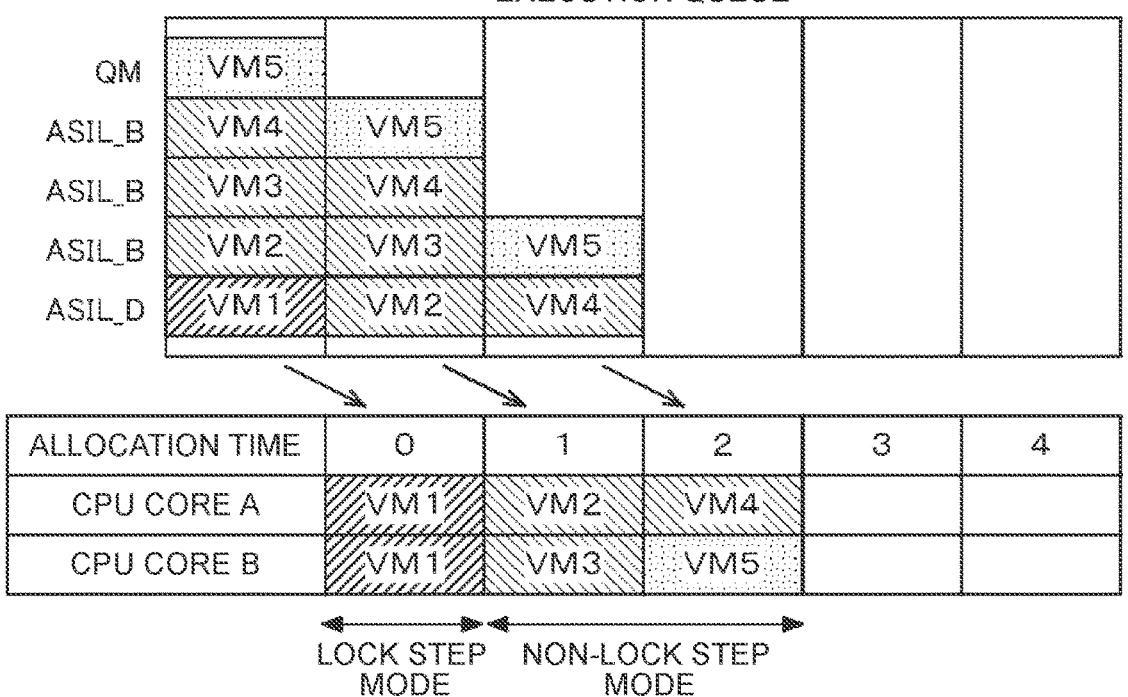
FIG. 4 illustrates how virtual machines are allocated to CPU cores by a method of the present disclosure (Specific Example 1)

FIG. 4 illustrates how the virtual machines VM1 to VM5 shown in FIG. 3 are allocated to the CPU core A and the CPU core B according to the allocation process of the present embodiment.

As shown in FIG. 4, in allocation time "0," the priority levels of all the virtual machines VM1 to VM5 are checked, and the virtual machine VM1 having the highest priority is allocated to both the CPU core A and the CPU core B in the lock step mode, based on the required level ASIL-D. In allocation time "1," the priority levels of the virtual machines VM2 to VM5 are checked, and the virtual machine VM2 and the virtual machine VM3 are allocated to the CPU core A and the CPU core B in the non-lock step mode, based on the required level ASIL-B, respectively. In allocation time "2," the priority levels of the virtual machines VM4 and VM5 are checked, and the virtual machine VM4 and the virtual machine VM5 are respectively allocated to the CPU core A and the CPU core B in the non-lock step mode, based on the order of priority and the required levels.

Figure 9:
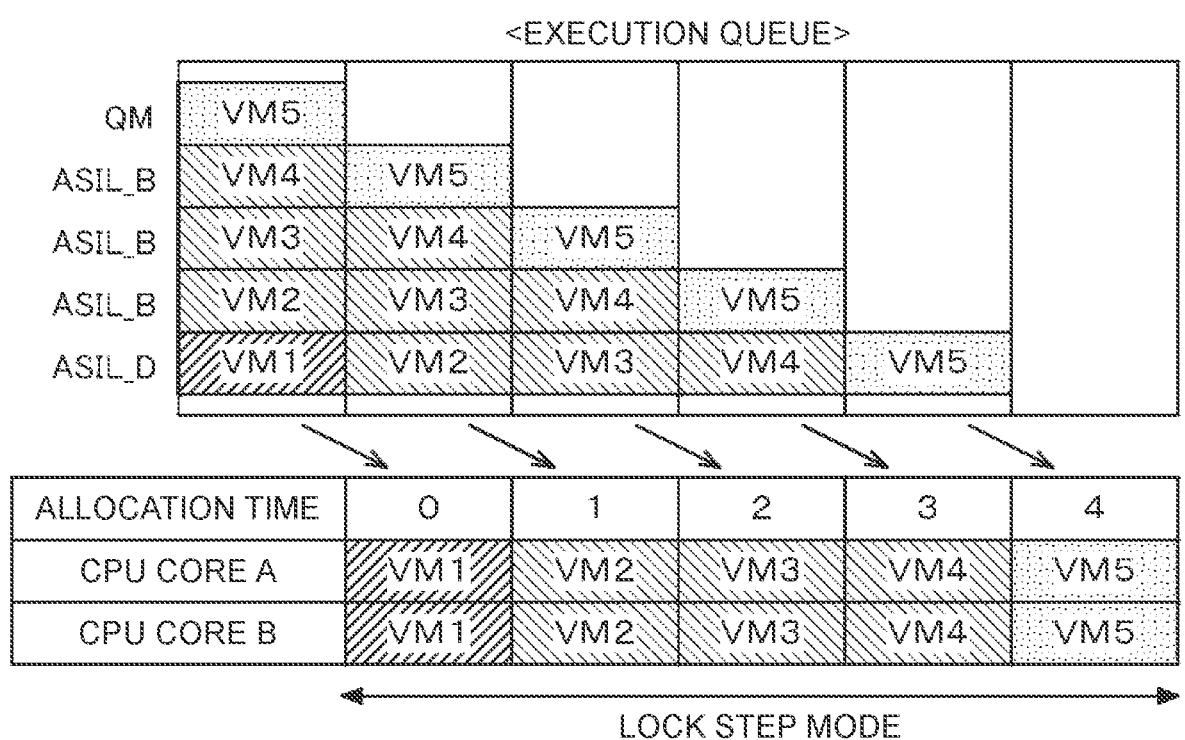
FIG. 9 illustrates how a plurality of virtual machines is allocated to a plurality of CPU cores by a method of related art.

For comparison, FIG. 9 illustrates an allocation method of a related art in which all virtual machines waiting for execution are allocated to both the CPU core A and the CPU core B. As in Specific Example 1 illustrated in FIG. 4, the allocation method of the present embodiment improves the CPU processing capability for applications having a low required level of the priority level and improves the overall throughput (efficiency) of the device, as compared to the allocation method of the related art illustrated in FIG. 9.

OTHER SPECIFIC EXAMPLES

Figure 5:
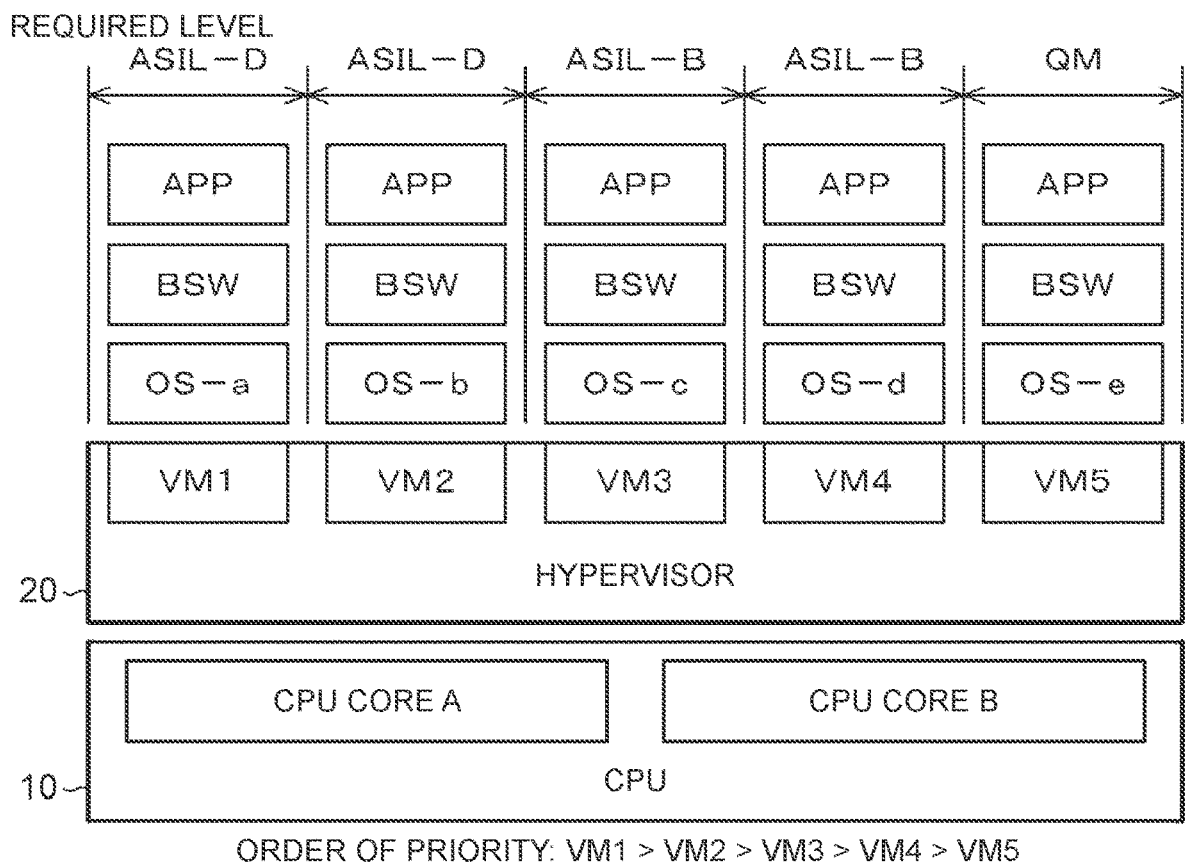
FIG. 5 illustrates an example of a configuration included in the information processing device (Specific Example 2)
Figure 6:
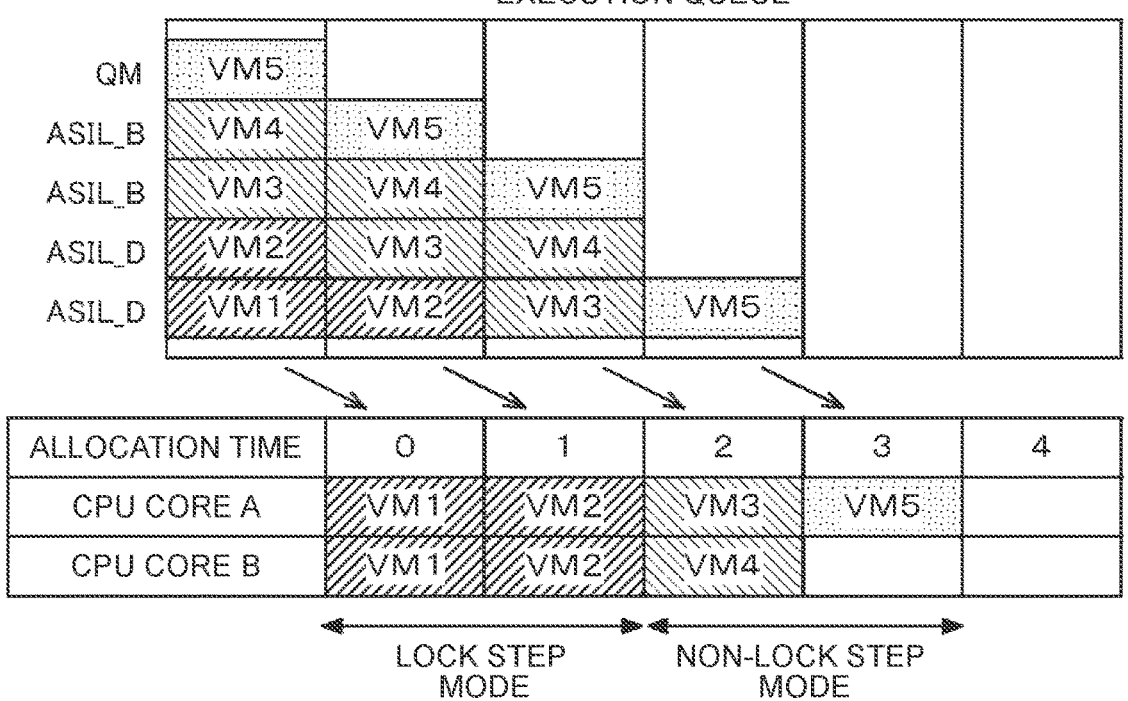
FIG. 6 illustrates how the virtual machines are allocated to the CPU cores by the method of the present disclosure (Specific Example 2)

FIG. 5 illustrates another configuration example included in the information processing device 1 (Specific Example 2). FIG. 6 illustrates how the virtual machines VM1 to VM5 in FIG. 5 are allocated to the CPU core A and the CPU core B according to the allocation process of the present embodiment.

In Specific Example 2 illustrated in FIG. 5, the processing units that are mounted on the CPU 10 are the CPU core A and the CPU core B, and the virtual machines VM1 to VM5 in which an OS, BSW, and an application (APP) are implemented are running on the hypervisor 20. Required levels for functional safety ASIL-D, ASIL-D, ASIL-B, ASIL-B, and QM and the order of priority VM1>VM2>VM3>VM4>VM5 are given to the virtual machines VM1, VM2, VM3, VM4, and VM5, respectively, as priority levels. Specific Example 2 is an example in which there are a plurality of virtual machines with a required level ASIL-D that are run in the lock step mode.

As shown in FIG. 6, in allocation time "0," the priority levels of all the virtual machines VM1 to VM5 are checked, and the virtual machine VM1 having the highest priority is allocated to both the CPU core A and the CPU core B in the lock step mode, based on the required level ASIL-D. In allocation time "1," the priority levels of the virtual machines VM2 to VM5 are checked, and the virtual machine VM2 having the highest priority among the virtual machines VM2 to VM5 is allocated to both the CPU core A and the CPU core B in the lock step mode, based on the required level ASIL-D. In allocation time "2," the priority levels of the virtual machines VM3 to VM5 are checked, and the virtual machines VM3 and VM4 are respectively allocated to the CPU core A and the CPU core B in the non-lock step mode, based on the required level ASIL-B. In allocation time "3," the remaining virtual machine VM5 is allocated to the CPU core A (or the CPU core B) in the non-lock step mode.

Figure 7:
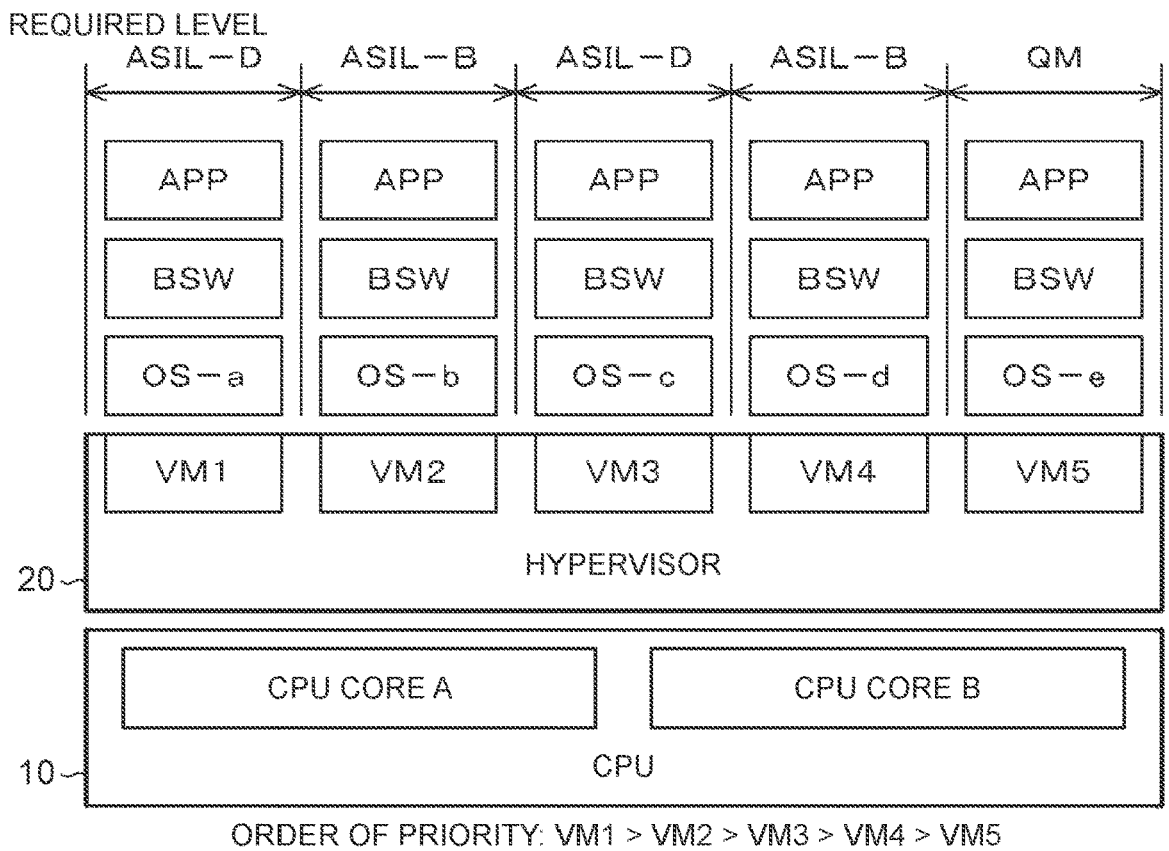
FIG. 7 illustrates an example of a configuration included in the information processing device (Specific Example 3)
Figure 8:
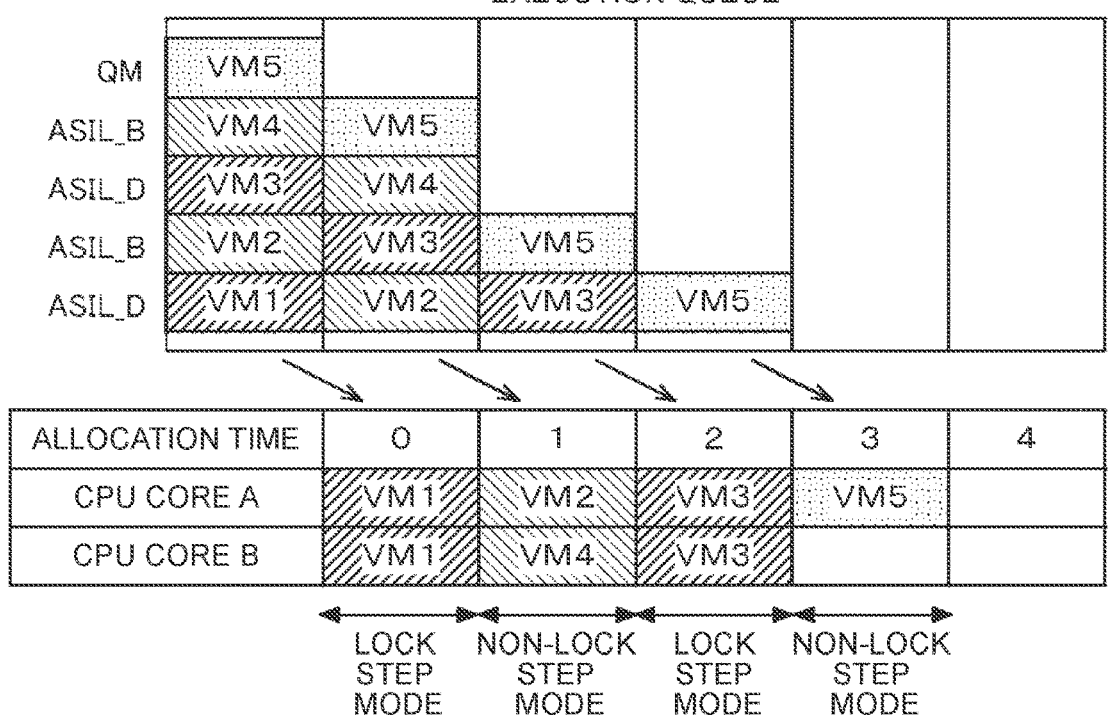
FIG. 8 illustrates how the virtual machines are allocated to the CPU cores by the method of the present disclosure (Specific Example 3)

FIG. 7 illustrates still another configuration example included in the information processing device 1 (Specific Example 3). FIG. 8 illustrates how the virtual machines VM1 to VM5 in FIG. 7 are allocated to the CPU core A and the CPU core B according to the allocation process of the present embodiment.

In Specific Example 3 illustrated in FIG. 7, the processing units that are mounted on the CPU 10 are the CPU core A and the CPU core B, and the virtual machines VM1 to VM5 in which an OS, BSW, and an application (APP) are implemented are running on the hypervisor 20. Required levels for functional safety ASIL-D, ASIL-B, ASIL-D, ASIL-B, and QM and the order of priority VM1>VM2>VM3>VM4>VM5 are given to the virtual machines VM1, VM2, VM3, VM4, and VM5, respectively, as priority levels. Specific Example 3 is an example in which there are a plurality of virtual machines with a required level ASIL-D that are run in the lock step mode and there is a virtual machine with a required level ASIL-B and with higher priority than the virtual machines with a required level ASIL-D.

As shown in FIG. 8, in allocation time "0," the priority levels of all the virtual machines VM1 to VM5 are checked, and the virtual machine VM1 having the highest priority is allocated to both the CPU core A and the CPU core B in the lock step mode, based on the required level ASIL-D. In allocation time "1," the priority levels of the virtual machines VM2 to VM5 are checked, and the virtual machine VM2 having the highest priority among the virtual machines VM2 to VM5 is first allocated to the CPU core A in the lock step mode, based on the required level ASIL-B. The virtual machine VM4 having a required level ASIL-B and having a higher priority out of the virtual machines that allow execution in the non-lock step mode is allocated to the CPU core B. In allocation time "2," the priority levels of the virtual machines VM3 and VM5 are checked, and the virtual machine VM3 having a higher priority out of the virtual machines VM3 and VM5 is allocated to both the CPU core A and the CPU core B in the lock step mode, based on the required level ASIL-D. In allocation time "3," the remaining virtual machine VM5 is allocated to the CPU core A (or the CPU core B) in the non-lock step mode.

In both Specific Example 2 illustrated in FIG. 6 and Specific Example 3 illustrated in FIG. 8, the allocation method of the present embodiment improves the CPU processing capability for applications having a low required level of the priority level and improves the overall throughput (efficiency) of the device, as compared to the conventional allocation method illustrated in FIG. 9.

Operations and Effects

As described above, the information processing device according to the embodiment of the present disclosure has stored in the storage unit the priority levels that are given in advance to the plurality of virtual machines, and the priority level includes a required level for functional safety of the virtual machine and the priority of the virtual machine. The information processing device of the present embodiment allocates the virtual machines waiting for execution of processing to the plurality of CPU cores based on the priority levels (required levels and order of priority).

In this allocation process, a virtual machine having a required level that is equal to or higher than a predetermined reference level is allocated in parallel to the plurality of CPU cores by the lock step mode, and a virtual machine having a required level that is lower than the predetermined reference level is allocated to one of the CPU cores by the non-lock step mode.

Accordingly, in the information processing device of the present embodiment, the CPU processing capability for applications having a low required level of the priority level can be improved and the overall throughput (efficiency) of the device can be improved.

Although one embodiment of the technique of the present disclosure is described above, the present disclosure can be interpreted not only as a control device but also as a control method that is performed by a control device including a processor and a memory, a control program of the control method, a computer-readable non-transitory storage medium having the control program stored therein, or a vehicle equipped with control device, etc.

The present disclosure can be used as an information processing device that is mounted on vehicles etc.

What is claimed is:

1. An information processing device equipped with a hypervisor configured to implement a plurality of virtual machines including a first virtual machine, a second virtual machine, and a third virtual machine, the information processing device comprising:
a central processing unit (CPU) including a plurality of CPU cores, wherein
the CPU is configured to:
when a virtual machine to be executed included in the virtual machines is the first virtual machine having a required level for functional safety that is equal to or higher than a predetermined reference level, cause at least two of the CPU cores to respectively execute same processing of the first virtual machine; and
when there is a plurality of the virtual machines to be executed, perform control to cause the CPU cores to execute processing of the virtual machines in order from the virtual machine with a higher priority based on an order of priority of the virtual machines,
the predetermined reference level is a required level for functional safety that is given to functions that directly relate to traveling of a vehicle including at least one of an airbag, an anti-lock braking system, or an electric power steering system,
a required level of the first virtual machine is a required level that is given to functions that directly relate to traveling of the vehicle,
a required level of the second virtual machine is a required level that is given to functions that indirectly relate to safety,
a required level of the third virtual machine is a required level that is given to functions that do not affect safety even if a failure occurs, and
a priority of the first virtual machine is higher than a priority of the second virtual machine, and the priority of the second virtual machine is higher than a priority of the third virtual machine.

2. The information processing device according to claim 1, wherein the CPU is configured to, when the virtual machine to be executed is the second virtual machine having the required level that is lower than the predetermined reference level, cause one of the CPU cores to execute processing of the second virtual machine.

3. A vehicle comprising the information processing device according to claim 1.

4. A control method that is performed by a central processing unit (CPU) of an information processing device equipped with a hypervisor configured to implement a plurality of virtual machines including a first virtual machine, a second virtual machine, and a third virtual machine, the CPU including a plurality of CPU cores, the control method comprising:
when a virtual machine to be executed included in the virtual machines is the first virtual machine having a required level for functional safety that is equal to or higher than a predetermined reference level, causing at least two of the CPU cores to respectively execute same processing of the first virtual machine; and
when there is a plurality of the virtual machines to be executed, performing control to cause the CPU cores to execute processing of the virtual machines in order from the virtual machine with a higher priority based on an order of priority of the virtual machines, wherein
the predetermined reference level is a required level for functional safety that is given to functions that directly relate to traveling of a vehicle including at least one of an airbag, an anti-lock braking system, or an electric power steering system,
a required level of the first virtual machine is a required level that is given to functions that directly relate to traveling of the vehicle,
a required level of the second virtual machine is a required level that is given to functions that indirectly relate to safety,
a required level of the third virtual machine is a required level that is given to functions that do not affect safety even if a failure occurs, and
a priority of the first virtual machine is higher than a priority of the second virtual machine, and the priority of the second virtual machine is higher than a priority of the third virtual machine.

5. A non-transitory storage medium storing a control program that is executable by a central processing unit (CPU) of an information processing device equipped with a hypervisor configured to implement a plurality of virtual machines including a first virtual machine, a second virtual machine, and a third virtual machine and that causes the CPU to perform functions, the CPU including a plurality of CPU cores, the functions comprising:
when a virtual machine to be executed included in the virtual machines is the first virtual machine having a required level for functional safety that is equal to or higher than a predetermined reference level, causing at least two of the CPU cores to respectively execute same processing of the first virtual machine; and
when there is a plurality of the virtual machines to be executed, performing control to cause the CPU cores to execute processing of the virtual machines in order from the virtual machine with a higher priority based on an order of priority of the virtual machines, wherein
the predetermined reference level is a required level for functional safety that is given to functions that directly relate to traveling of a vehicle including at least one of an airbag, an anti-lock braking system, or an electric power steering system,
a required level of the first virtual machine is a required level that is given to functions that directly relate to traveling of the vehicle,
a required level of the second virtual machine is a required level that is given to functions that indirectly relate to safety,
a required level of the third virtual machine is a required level that is given to functions that do not affect safety even if a failure occurs, and a priority of the first virtual machine is higher than a priority of the second virtual machine, and the priority of the second virtual machine is higher than a priority of the third virtual machine.

\* \* \* \* \*